Oct. 18, 1949.  G. FASSIN  2,485,089
OPTICAL SLIT

Filed March 29, 1946  2 Sheets-Sheet 1

INVENTOR
Gustave Fassin
BY
Lyle Dillon
ATTORNEY

Oct. 18, 1949.     G. FASSIN     2,485,089
OPTICAL SLIT

Filed March 29, 1946     2 Sheets-Sheet 2

INVENTOR
Gustave Fassin
BY
Lyle Dillon
ATTORNEY

Patented Oct. 18, 1949

2,485,089

UNITED STATES PATENT OFFICE 2,485,089

OPTICAL SLIT

Gustave Fassin, Los Gatos, Calif., assignor, by mesne assignments, to Lane-Wells Company, Los Angeles, Calif., a corporation of Delaware Application March 29, 1946, Serial No. 658,098

18 Claims. (Cl. 88—61)

This invention relates, in general, to slit mechanisms to be employed in optical instruments, and more particularly to a slit mechanism primarily adapted for use in various types of optical instruments, such as spectrometers, spectrographs, monochromators, and the like devices.

The principal difficulty encountered in spectrographic technique is encountered in attempting to effect a continuous variation of the slit opening width through the extremely small increments and with the high degree of precision required. It has also been difficult to maintain parallelism between the adjacent edges of the slit jaw blade while varying the slit width whereby a uniform width from end to end thereof could be assured. The measurement or determination of the precise slit width at all times during variation thereof has also presented considerable difficulty.

A primary object of this invention is to overcome the hereinbefore described difficulties encountered in the construction and operation of optical slits by providing an improved mechanism which will be sensitive and accurate in operation, yet relatively simple and rugged in construction.

Another object of this invention is, accordingly, to provide an improved slit mechanism capable of precise and smooth, continuously variable adjustments of the slit width while simultaneously maintaining the parallel alignment of the slit jaw blades to a high degree of precision.

Still another object of this invention is to provide a means to measurably adjust the slit width over a suitable range of widths, and which will be capable of precise reproduction of and adjustment to any given slit width corresponding to the measurement indication.

The foregoing objects are attained, in general, by a novel slit mechanism in which all sliding or rotating supports for the jaws themselves have been eliminated, the motion of the jaws being provided by mounting them upon suitable elastic members which are deflected to move the jaws with respect to one another, and a micrometer adjustment for actuating said deflecting means whereby predetermined and measured spacing of the slit opening jaws can be effected and re-established at will.

These and other objects, advantages, and features of novelty will be evident hereinafter.

In the drawings which show by way of illustration a preferred embodiment of the invention and in which like reference numerals designate the same or similar parts throughout the several views.

Figure 1:
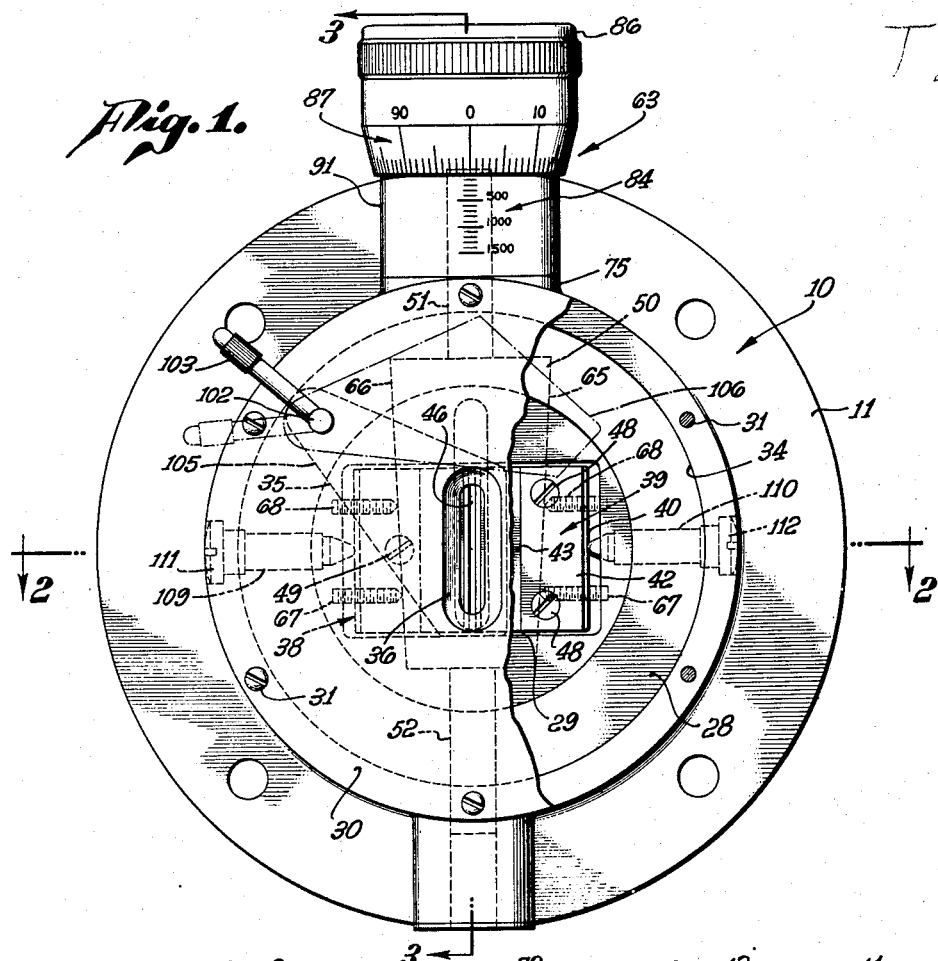
Figure 1 is a front elevational view partly in section of the slit mechanism assembly.

Referring now to the drawings, 10 is a generally cylindrically-shaped housing having a flanged rearward end as shown at 11 by means of which the slit mechanism assembly may be suitably bolted to the light entry aperture portion of the case of a spectrograph or the like optical instrument.

The housing 11 has an irregularly contoured interior adapted to enclose and support the slit mechanism and providing, under certain circumstances, a light passage therethrough from side to side of the housing as hereinafter more fully described.

In the interior portion of the housing adjacent the flanged end thereof is provided a cylindrical depression 13 having a depth determined by the upper faces of the four inwardly directed curved housing bosses shown at 14, 15, 16, and 17.

A frame member 18 having a circular outer edge 19 and an inner, approximately rectangular opening 20 therethrough and bordered by a raised marginal portion 21 rests within the beforementioned recess 13 upon the said upper end faces of the housing bosses 15—17 and is fastened there in place by means of suitable cap screws as illustrated at 23, 24, 25, and 26. The forward end of the cylindrical housing 10 is provided with an integral end closure diaphragm or web member 28 having a centrally located, rectangularly shaped opening 29 therethrough.

Figure 2:
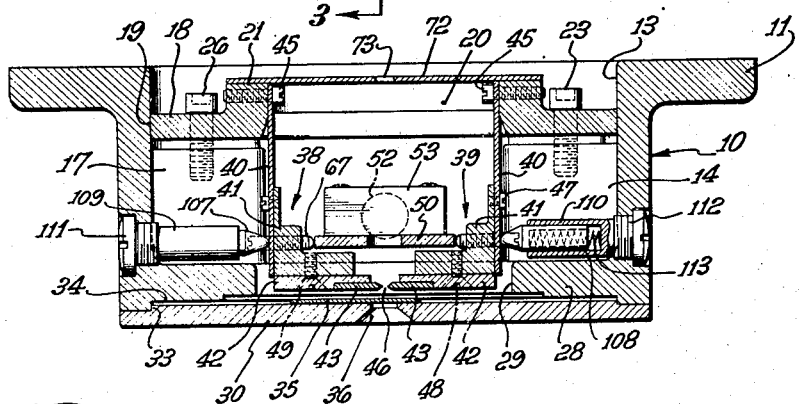
Figure 2 is a horizontal cross-sectional view taken on line 2—2 of Figure 1.
Figure 3:
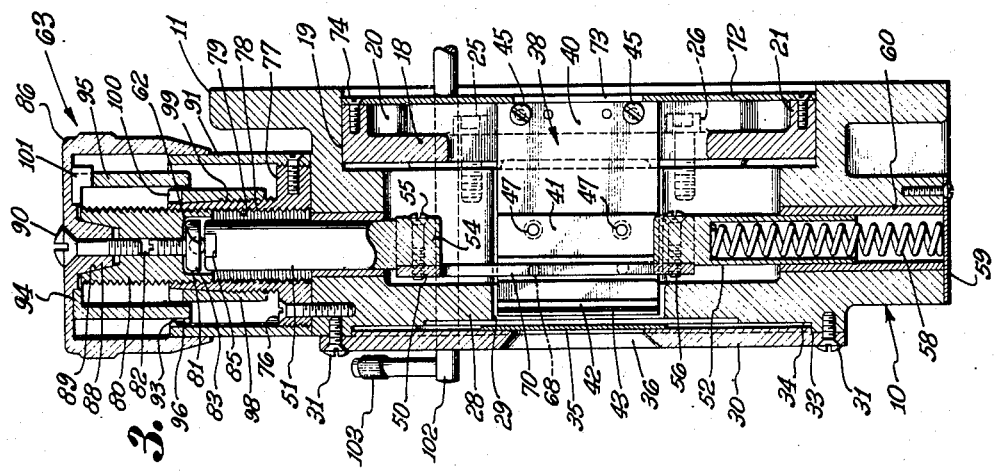
Figure 3 is a vertical cross-sectional view taken on line 3—3 of Figure 1.

A disc-shaped, front face-plate 30 covers the front end of the housing 10 and is held in place thereon by a plurality of screws as shown at 31. The face-plate 30 is retained in centered position upon the front end of the housing 10 by means of an inwardly projecting shoulder 33 which enters and makes a snug fit within a mating annular recess 34 in the outer face of the beforementioned end closure member 28. This recess 34 as best shown in Figures 2 and 3, is made sufficiently deep to provide clearance space to contain in sliding fit, a thin shutter member or plate 35 which is movable laterally to open and close the aperture leading to the slit mechanism as hereinafter more fully described.

The face-plate 30 is provided with a vertically elongated aperture 36 therethrough and is located in substantially coaxial alignment with the housing 10, the rectangular opening 29 and the substantially rectangular opening 20 through the central portion of the rear frame member 18. The said elongated aperture 36 constitutes the light entrance for passage through the slit mechaism within the housing.

The slit and slit mounting jaws, together with certain of its actuating mechanism, is contained within the hereinbefore described housing and comprises the following parts:

The slit and slit supporting mechanism comprises two identical but oppositely positioned slit jaw assemblies as shown at 38 and 39. Each slit jaw mechanism comprises a slit jaw supporting cantilever spring member 40, a slit jaw angle 41, slit blade holders 42, and oppositely positioned slit blades 43.

The slit jaw supporting cantilever members 40 are fixed at the inner end by suitable means such as a pair of cap screws 45 and 46 to the opposite inner edges of the raised marginal portion 21 of the opening 20 through the frame member 18. The slit jaw angles 41 are attached to the opposite free outer end portions of the supporting cantilever members 40 by suitable means such as the screws shown at 47 and 48. The slit blade holders 42 are in turn, suitably attached to the outer faces of the jaw angles 41 by suitable means such as the counter-sunk screws shown at 48, and 49. One of the blade holders is preferably screwed to its jaw angle by means of two screws 48 while the other is attached by a single screw as shown at 51 whereby the blade edge may be initially adjusted for parallelism with the opposite blade edge by pivoting the one blade holder about said screw 49.

Figure 4:
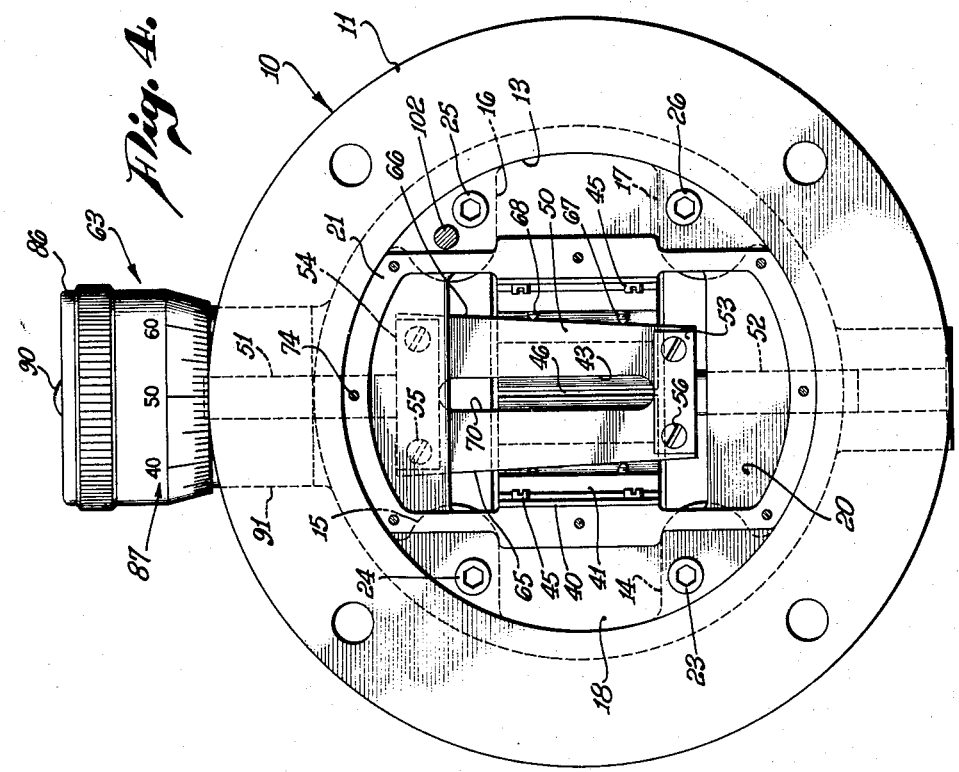
Figure 4 is a rear elevational view of the slit mechanism opposite to that shown in Figure 1.

The slit blades in themselves as shown at 43, are attached to the oppositely positioned outer portions of the slit blade holders by any suitable means such as by soldering or spot welding said slit blades being positioned with their sharpened edges opposite to one another and in precise parallelism to form a variable slit therebetween of uniform width from end to end thereof as best shown at 46 in Figures 1 and 4.

The hereinbefore described slit jaw supporting spring members 40 are preferably made of relatively thin resilient metal such as, for example, spring brass or spring steel stock, and they are preferably wide in the direction perpendicular to the direction of flexure in order to impart a maximum of rigidity to the blade supporting mechanism in the direction parallel to the slit blade edges. Normally, the slit blade holders 42 are adjusted in position on the jaw angles 41 such that the slit 46 will be forced to a fully closed condition under the bending stress of the supporting spring members 40, unless otherwise strained from closing by means of the slit width adjusting mechanism associated with the jaw assembly.

The slit width adjusting mechanism comprises a tapered or wedge-shaped yoke member or runner slide member 50 vertically slidably supported with respect to the apparatus as viewed in Figures 1, 3, and 4 upon upper and lower plungers 51 and 52, respectively. The lower plunger 52 carries at the upper end and integral therewith, a lower cross-head member 53 and the upper plunger 51 carries at its lower end and integral therewith an upper cross-head member 54. These cross-head members 53 and 54 form attachments for the yoke member 50 and attachment is effected between the upper and lower ends of the yoke member 50 and the upper and lower cross-head members 53 and 54, respectively, by suitable means such as a plurality of interconnecting screws as shown at 55 and 56. The lower yoke supporting plunger 52 is hollow and contains a helical spring 58 which normally acts under compression between the plunger and a removable bottom plate 59 attached to the housing 10 and which closes the lower end of a plunger guide bushing 60 retained within the lower portion of housing 10 to urge the assembly comprising the plunger 52, yoke member 54 and upper plunger 51 upward against a ball stop 62. The upper plunger 51 is slidably supported within a guide bushing 57 retained within the upper portion of the body 10 and coaxial with the lower bushing 60. The ball stop 62 acting against the top of the plunger 51 determines and controls the vertical position of the assembly comprising the plungers 51 and 52 and the yoke member 50 and is adjustable vertically by means of a micrometer screw mechanism shown generally at 63.

The hereinbefore mentioned yoke or slide member 50 is shaped with straight, downwardly converging edge surfaces as shown at 65 and 66 which serve as runner slides or guides upon which the inner end of a pair of spaced adjustable runner screws or the like runner members slidably bear at points spaced longitudinally or lengthwise with respect to said runner slide surfaces as shown at 67 and 68. The runner screws are adjustably threaded through each of the before described slit jaw angles 41.

The wedge yoke 50 is provided with a centrally positioned, elongated aperture 70 therethrough which remains, as the yoke is moved, in longitudinal adjustment, in substantial alignment with both the beforementioned light entrance aperture 36 in the face-plate 30 and the slit 46 between the slit blades 43.

A rear cover plate 72 also provided with a centrally located, elongated slot 73 in alignment with the beforementioned apertures 70 and 36 and the slit 46, serves to enclose the before described slit operating mechanism within the housing and this cover plate is approximately rectangular in form having curved end portions adapted to fit upon and conform in outline with the upper enclosed surface of the before described upturned or raised marginal portion 21 surrounding the opening 20 in the frame member 18 and is held in place by suitable means such as a plurality of cap screws as shown at 74.

The beforementioned micrometer screw adjusting mechanism 63 comprises a flanged fitting, retained, in a position concentric with the upper plunger 51 upon a boss 75 formed on the exterior top portion of the housing 10, by means of a plurality of screws as shown at 76. The inner surface of the upstanding tubular portion 78 of the flanged fitting 77 is threaded as shown at 79 to receive a threaded micrometer screw 80.

The lower end of the micrometer screw 80 is cylindrically recessed at 81 and provided with a threaded bore at 82 to receive, in adjustable threaded engagement, a thrust-bearing member 83. The thrust-bearing member 83 carries on the lower surface a centrally located spherical seat in which the beforementioned ball stop 62 is retained.

The upper end of the plunger 51 is provided with a lateral slot 85 into which is pressed a hardened metal seat, the upper surface of which bears, under the force of the beforementioned spring 58, against the thrust ball 62.

A knurled knob 86 carrying a graduated dial as shown at 87 of the type usually employed in micrometer instruments, is adjustably attached to the upper end of the micrometer screw 80 by means of a tapered shank 88 which fits into a correspondingly tapered socket 89 in the top end of the micrometer screw 80 and is retained there under the force of a screw 90. By loosening the screw 90 and the freeing of the tapered joints 88 and 89, the micrometer knob 86 may be adjustably rotated with respect to the micrometer screw 80 to bring the graduations of the dial 87 into a position relative to the vertically disposed graduations 84 corresponding with the actual width of the slit 46.

A tubular sleeve 91 which is threaded at 92 upon the flanged fitting 77 extends upward into telescoping position within the downwardly extending graduated dial skirt portion of the micrometer screw knob 86 and carries a vertical scale having graduations 84 adapted to cooperate with the dial graduations 78. The vertical scale may be graduated to read in 100 micron steps while the dial is graduated in single micron intervals.

Set to and supported in an inwardly projecting position at the inner upper portion of the said sleeve member 91 is an inwardly projecting stop member 93. Extending downwardly from its point of attachment at 94 within the inner upper end of the micrometer dial 86 is another sleeve member 95 which extends into the upper end of the first-mentioned upwardly extending sleeves 91 and carries at its lower outer surface another stop member 96. The stop members 93 and 96 are adapted to come into engagement with one another at a predetermined outer extreme position of the micrometer screw mechanism and thus limit the maximum upper portion of the plunger 51, and, consequently, determine through the action of the yoke 66 the minimum opening of the slit 46.

As screwed stop bushing member 98 makes threaded engagement at 99 with the upstanding exterior portion of the flange member 77 and carries at its upper end a stop member 100, the upper end of the sleeve member 95 carries another stop member 101 adjacent the upper inner end of the micrometer dial knob 86. The stop members 100 and 101 are thus adapted to come into engagement with one another at the extreme lower position of the micrometer dial 86 and thus to limit the maximum downward position of the micrometer screw 80 and the plunger 51 and thus through the action of the yoke 66 to limit the maximum opening width of the slit 46.

As previously stated, a shutter member or plate 35 is provided and movably or slidably retained in a recess 34 formed back of the front faceplate 30 and this shutter 35 is fixed to a shaft 102 which is rotatably supported in a suitable bore extending through the body 10 and through the front of the face-plate 30. A laterally extending handle member 103 is provided for manually rotating the shaft 102 and thus moving the shutter from a closed position as shown in dotted lines at 105 which covers the slit and closes the light entrance aperture 36 to an open position as shown in dotted lines at 106 away from the light entrance aperture 36.

While the slit jaw supporting spring members 40 are usually sufficiently resiliently stressed or biased to a closing position, additional closing force may be supplied if desired, tending to more firmly hold the runner ends of the adjusting screws 67 and 68 against the slide surfaces 55 and 56 of the wedge yoke 50, and thus to more positively tend to close the slit 46. This may be accomplished by means of a pair of spring-pressed plungers 107 and 108 which are slidably retained within tubular housing members 109 and 110. The tubular housing members 109 and 110 extend inwardly through the walls of the housing 10 and make threaded attachment therewith at 111 and 112. Springs contained within central bores of the plungers 107 and 108 and within the housing members 109 and 110 as shown at 113 urge the said plungers inwardly to bring the runner ends thereof forcibly against the outer faces of the slit jaw spring members 40.

The operation of the hereinbefore described apparatus of this invention is as follows:

Upon installation of the hereinbefore described slit mechanism, the adjustable runner screws shown at 67 and 68 are adjusted to bear upon the guides 65 and 66 of the yoke member 50 in such a manner that the width of the slit 46 will be uniform from top to bottom and will correspond in width with the readings indicated by the graduations 87, 84. Parallelism of the adjacent edges of the slit blades 43 may also be established by adjustment of the position of the slit blade holder which is pivotally supported by the single screw 49.

After adjustment of the slit blade for parallelism and to a setting which corresponds with the slit width dimensions as indicated by the micrometer graduations 84, 87, the slit width may then be readily varied by manipulation of the micrometer dial 86 to smoothly open or close the slit to any desired width, and the width determined by the graduations 84, 87 to the nearest micron.

When the apparatus of this invention is attached to the light opening portion of an instrument such as a spectrograph and a width adjustment of the slit is being performed, the shutter 35 is normally maintained in the closed position as shown in dotted lines at 105 to protect any sensitized material or film which may be present in the instrument for photographically recording a spectrum. When all adjustments have been made, the shutter 35 may be moved to the open position as shown at 106 permitting exposure of the photographic material.

It is to be understood that the foregoing is illustrative only, and that the invention is not limited thereby but may include various modifications and changes made by those skilled in the art without departing from the spirit and scope of the invention as defined in the appended claims.

I claim:

1. In an optical slit, apparatus comprising: a housing; a support in said housing; a pair of oppositely disposed resilient cantilever members, each fixed adjacent one end to said support within said housing; a pair of oppositely positioned jaw members, each carried by one of said cantilever members adjacent the other end; a slit blade fixed to each of said jaw members, said slit blades being positioned opposite to one another to form therebetween a slit opening of variable width in said housing; a yoke member movably supported intermediate said jaw members in guides associated with said housing, said yoke member having a pair of convergingly directed runner slides; a plurality of adjustable runner elements associated with each of said jaw members, the runner elements of each jaw member being positioned to bear slidably on opposite ones of said converging runner slides under deflecting stresses in said cantilever members; means to move said yoke member in said guides to move said jaw members and deflect said cantilever members in opposite directions to vary the spacing between said slit blades while maintaining their parallelism; and a shutter movably supported in said housing and adapted to be moved between positions covering and exposing said variable slit opening.

2. In an optical slit, apparatus comprising: a housing; a support in said housing; a pair of oppositely disposed resilient cantilever members, each fixed adjacent one end to said support within said housing; a pair of oppositely positioned slit edges, each carried by one of said cantilever members adjacent the other end and forming therebetween a slit opening of variable width; a yoke member movably supported intermediate said cantilever members in guides associated with said housing, said yoke having a pair of convergingly directed runner slides; an adjustable runner element associated with each of said cantilever members, the runner element of each cantilever being positioned to bear slidably on opposite ones of said converging runner slides under deflecting stresses in said cantilever members; means to move said yoke member in said guides to deflect said cantilever members in opposite directions to vary the spacing between said slit edges; and a shutter movably supported in said housing and adapted to be moved between positions covering and exposing said variable slit opening.

3. In an optical slit, apparatus comprising: a support; a pair of oppositely disposed resilient cantilever members, each fixed adjacent one end to said support; a pair of oppositely positioned jaw members, each carried by one of said cantilever members adjacent the outer end; a slit blade fixed to each of said jaw members; a yoke member movably supported intermediate said jaw members in a guide associated with said support, said yoke having a pair of oppositely disposed, convergingly directed runner slides; an adjustable runner element associated with each of said jaw members, the runner element of each jaw member being positioned to bear slidably on opposite ones of said runner slides under deflecting stresses in said cantilever members; and means to move said yoke member in said guide to move said jaw members and to deflect said cantilever members in opposite directions to vary the spacing between said slit blades.

4. In an optical slit, apparatus comprising: a support; a pair of oppositely disposed resilient cantilever members, each fixed adjacent one end to said support; a pair of parallel, oppositely positioned slit edges, each carried by one of said cantilever members adjacent the other end; a yoke member movably supported intermediate said cantilever members in a guide associated with said support, said yoke having a pair of straight oppositely disposed, convergingly directed runner slides; a plurality of runner elements associated with each of said cantilever members, the runner elements of each cantilever member being spaced apart laterally with respect to the longitudinal axis of said cantilever member and substantially at right angles to the direction of deflection thereof and positioned to bear slidably on one of said runner slides under deflecting stresses in said cantilever members; and means to move said yoke member in said guide to deflect said cantilever members in opposite directions to vary the spacing between said slit edges while maintaining their parallelism.

5. In an optical slit, apparatus comprising: a support; a pair of oppositely disposed resilient cantilever members, each fixed adjacent one end to said support; a pair of oppositely positioned slit edges, each carried by one of said cantilever members adjacent the other end; a wedge member movably supported intermediate said cantilever members in guides associated with said support, said wedge member having a pair of oppositely acting convergingly directed runner slides; an adjustable runner element associated with each of said cantilever members and positioned each to bear slidably on opposite ones of said runner slides under deflecting stresses in said cantilever members; and means to move said wedge member in said guide to deflect said cantilever members in opposite directions to vary the spacing between said slit edges.

6. In an optical slit, apparatus comprising: a support; a pair of approximately parallel, resilient cantilever members, each member being fixed adjacent one end to said support; a pair of parallel, oppositely positioned slit edges, each fixed to one of said cantilever members adjacent the other end; and means engaging said cantilever member to deflect said cantilever members laterally in bending in opposite directions substantially perpendicular to said slit edges to vary the spacing between said slit edges; and means associated with said deflecting means to indicate the spacing of said slit edges.

7. In an optical slit, apparatus comprising: a support; a pair of approximately parallel, resilient cantilever members, each member being fixed adjacent one end to said support; a pair of parallel, oppositely positioned slit edges, one of each fixed to one of said cantilever members adjacent the other end; and means engaging said cantilever member to deflect said cantilever members laterally in bending in opposite directions substantially perpendicular to said slit edges to vary the spacing between said slit edges.

8. In an optical slit, apparatus comprising: a support; a resilient cantilever member fixed adjacent one end thereof to said support; a slit edge carried by said cantilever member adjacent the other end thereof; adjustable runner elements carried by said cantilever member adjacent said slit edge; a runner slide movably supported in a guide associated with said support and having a slide surface disposed at an angle to the direction of motion of said runner slide permitted by said guide, said runner elements slidably bearing on said runner slide surface under lateral deflecting stress in said cantilever member; and means to move said runner slide in said guide to deflect laterally said cantilever.

9. In an optical slit, apparatus comprising: a support; a resilient cantilever member fixed adjacent one end thereof to said support; a slit edge carried by said cantilever member adjacent the other end thereof; adjustable runner elements carried by said cantilever member adjacent said slit edge; a runner slide movably supported in a guide associated with said support and having a slide surface disposed at an angle to the direction of motion of said runner slide permitted by said guide, said runner elements slidably bearing on said runner slide surface under lateral deflecting stress in said cantilever member; and surface means to move measurably said runner in said guide to deflect laterally said cantilever.

10. In an optical slit, apparatus comprising: a support; a resilient cantilever member fixed adjacent one end theerof to said support; a slit edge carried by said cantilever member adjacent the other end thereof; a runner element carried by said cantilever member adjacent said slit edge; a runner slide movably supported on said support and having a slide surface disposed at an angle to the direction of motion of said runner slide on said support, said runner element slidably bearing on said slide surface under lateral deflecting stress in said cantilever member; and means to move said runner slide in said guide to deflect laterally said cantilever.

11. In an optical slit, apparatus comprising: a support; a resilient cantilever member fixed adjacent one end thereof to said support; a slit edge fixed to said cantilever member adjacent the other end thereof; means engaging said cantilever member at an intermediate point to deflect said cantilever member laterally in bending in a direction substantially perpendicular to said slit edge to move said slit edge to predetermined parallel positions; means associated with said deflecting means to maintain parallelism of said slit edge for all said predetermined positions; and means to indicate the parallel movement of said slit edge.

12. In an optical slit, apparatus comprising: a support; a resilient cantilever member fixed adjacent one end thereof to said support; a slit edge fixed to said cantilever member adjacent the other end thereof; means to deflect said cantilever member laterally in bending in a direction substantially perpendicular to said slit edge to move said slit edge to predetermined parallel positions; and means associated with said deflecting means to maintain parallelism of said slit edge for all said predetermined positions.

13. In an optical slit, apparatus comprising: a support; a resilient cantilever member fixed adjacent one end thereof to said support; a slit edge fixed to said cantilever member adjacent the other end thereof; and means to deflect said cantilever member laterally in bending in a direction substantially perpendicular to said slit edge to move said slit edge to predetermined parallel positions and means associated with said deflecting means to indicate the parallel movement of said slit edge.

14. In an optical slit, apparatus comprising: a support; a resilient cantilever member fixed adjacent one end thereof to said support; a slit edge fixed to said cantilever member adjacent the other end thereof; and means to deflect said cantilever member laterally in bending in a direction substantially perpendicular to said slit edge to move said slit edge to predetermined positions.

15. In an optical slit, apparatus according to claim 10 in which the means to move said yoke member in said guides comprises a micrometer screw mechanism associated with said housing and having a graduated dial adapted to indicate the width of said variable slit opening.

16. In an optical slit, apparatus according to claim 8 in which said slide surface is straight and disposed at an angle with respect to the said direction of motion of said runner slide.

17. In an optical slit, apparatus according to claim 10 in which said slide surface is straight and disposed at an angle with respect to the said direction of motion of said runner slide.

18. In an optical slit, apparatus comprising: a support; a pair of oppositely disposed resilient cantilever members, each fixed adjacent one end to said support; a pair of oppositely positioned slit edges, each carried by one of said cantilever members adjacent the other end; a wedge member movably supported intermediate said cantilever members in a guide associated with said support, said wedge having a pair of oppositely acting, convergingly directed runner slide surfaces; a runner element associated with each of said cantilever members and positioned each to bear slidably on opposite ones of said runner slide surfaces under deflecting stresses in said cantilever members; and means to move said wedge member in said guide to deflect said cantilever members in opposite directions to vary the spacing between said slit edges.

GUSTAVE FASSIN.

REFERENCES CITED

The following references are of record in the file of this patent:

UNITED STATES PATENTS

| Number | Name | Date |
|---|---|---|
| 1,836,558 | Sherman | Dec. 15, 1931 |
| 2,408,512 | Gradisar | Oct. 1, 1946 |